United States Patent [19]

Drullmann et al.

[11] 4,264,972
[45] Apr. 28, 1981

[54] METHOD AND CIRCUIT FOR DETECTING ERRORS IN DIGITAL SIGNALS

[75] Inventors: Rainer Drullmann; Waldemar Frühauf, both of Nuremberg, Fed. Rep. of Germany

[73] Assignee: TE KA DE, Felten & Guilleaume Fernmoldeanlagen GmbH, Nuremberg, Fed. Rep. of Germany

[21] Appl. No.: 41,405

[22] Filed: May 21, 1979

[30] Foreign Application Priority Data

Aug. 19, 1978 [DE] Fed. Rep. of Germany ....... 2836445

[51] Int. Cl.³ .............................................. G06F 11/00
[52] U.S. Cl. ........................................ 371/55; 371/56; 375/19
[58] Field of Search ..................... 371/56, 55; 375/19; 235/92 EC, 92 NT

[56] References Cited

U.S. PATENT DOCUMENTS

| | | | |
|---|---|---|---|
| 3,439,330 | 4/1969 | Sipress et al. | 371/56 |
| 3,573,729 | 4/1971 | Gunn et al. | 371/56 |
| 3,757,296 | 9/1973 | Gibson | 371/56 |
| 3,902,117 | 8/1975 | Sheppard | 375/19 |
| 4,070,646 | 1/1978 | Sandlin | 371/56 |
| 4,110,691 | 8/1978 | Lender | 375/19 |

*Primary Examiner*—Charles E. Atkinson
*Attorney, Agent, or Firm*—Michael J. Striker

[57] ABSTRACT

A digital signal constituted by a stream of bits is so encoded that its running digital sum (RDS) is confined to a range defined by predetermined lower and upper permissible limits, i.e., absent transmission error. Instead of using a forwards-backwards digital counter to monitor the RDS, with its associated expense and relatively high power consumption when high transmission rates are involved, use is made of an analog integrator which integrates the digital signal to be monitored and generates an analog RDS signal. A digit-error signal is generated when the analog RDS signal attempts to exceed a predetermined analog value corresponding to the upper permissible limit of the RDS or to fall below a predetermined analog value corresponding to the lower permissible limit of the RDS. When the analog RDS signal makes such an attempt it is positively limited to an analog value corresponding to the affected one of the lower and upper permissible values of the RDS and for so long as such attempt continues, this constituting an advantageous way of terminating the response of the error-detecting system to the detected digit error.

13 Claims, 4 Drawing Figures 4,264,972

METHOD AND CIRCUIT FOR DETECTING ERRORS IN DIGITAL SIGNALS

BACKGROUND OF THE INVENTION

The present invention concerns methods and circuits for detecting errors in digital signals, of the type so encoded that the running digital sum of the digital signal monitored is confined between predetermined lower and upper limits, i.e., if the digital signal at the location monitored is free of error. With such methods and systems, if the running digital sum falls below the lower limit value or exceeds the upper limit value, this triggers an indication of faulty signal transmission.

In general, imposition of the criterion that the running digital sum (hereafter, RDS) of a digital signal be continuously confined within such limits requires resort to redundancy techniques because, in for example the case of a bit stream constituting transmitted information, the number of "0" bits versus the number of "1" bits is, in the absence of such redundancy, not controllable but instead dictated by the information to be transmitted.

Resort to a redundancy technique generally involves an increase in the number of logic levels to be exhibited by the transmitted digital signal. Alternatively, or in addition thereto, in order that the rate of transmission of actual information not be decreased, it is necessary to resort to an increase in the rate of transmission of the constituent digits of the redundancy-exhibiting digital signal, i.e., because of the word-length increase resulting from the redundant bits or digits.

An example of the first alternative—i.e., an increase in the number of logic levels employed—is to be found in the alternate mark inversion (AMI) technique. Use is made of a pseudoternary code, according to which every second "1" of the original bit stream is converted to a "−1" in the corresponding ternary signal. The rate of transmission of ternary bits can be the same as the bit transmission rate of the original binary signal. Inherently with such a technique, the RDS of the digital signal can only assume the three values −1, 0 and +1, i.e., assuming that the signal is being transmitted without error.

Both an increase in the number of logic levels employed, and an increase in the rate of digit transmission, are utilized in conjunction when resorting to redundancy techniques in the case of ternary block codes. For example, when employing a 4B/3T-code, the original binary signal is constituted by words of 4 bits each, and the corresponding ternary signal is constituted by words of three digits each, each digit being capable of assuming any one of three different logic levels. Accordingly, the digit transmission rate of the corresponding ternary signal can be reduced to three-fourths the value needed for the original binary signal, i.e., if the word transmission rate is to remain the same. If, now, resort is to be had to a redundancy technique, for the sake of a limited RDS, the reduced digit transmission rate made possible by the use of 4B/3T-code must be increased back to its original value.

The second of the two alternatives mentioned above—i.e., increase of the digit transmission rate employed—is used alone in the case of binary block codes. For example, when employing a 5B/6B-code, each word of the original redundancy-free signal is constituted by five bits, but for transmission purposes each original redundancy-free word is represented by a 6-bit word. This necessitates a 20% increase of the bit transmission rate employed, if the word transmission rate is not to be decreased. As persons skilled in the art will understand, as each original 5-bit word comes along for encoding into 6-bit code, the encoding scheme in accordance with which 6-bit words are assigned to represent the original 5-bit words can be so established that the RDS of the successive bits of the stream of 6-bit words can only assume seven different values. If each "1" bit in the stream of 6-bit words is assigned the value +1, and each "0" bit the value +1, then the encoding scheme in accordance with which 6-bit words are assigned to represent the original 5-bit words can be so established that the RDS of these values (+1 and −1) of the constituent bits of the stream of 6-bit words can only assume the values −3, −2, −1, 0, 1, 2 and 3, i.e., absent error in transmission. Accordingly, if at any time the absolute magnitude of the RDS is greater than 3, this indicates transmission error, e.g., interference, faulty operation of a repeater, or the like.

In this way, it becomes possible to monitor the RDS and accordingly the bit error rate at each repeater station of the communications path along which the digital signal is being transmitted, and furthermore, in per se conventional manner, to transmit this information concerning bit error rate to the ultimate destination of the transmitted digital signal.

This form of error detection is of particular importance when very high digit transmission rates are involved, because it does not require interruption of transmission of actual information, and accordingly loss of large amounts of information or loss of the possibility of its transmission, merely for the purpose of transmitting test signals or the like.

When this form of error detection is employed, use is generally made of forwards-backwards digital counters, for example operative for counting forwards by one in response to each "1" bit of a binary digital signal and counting backwards by one in response to each "0" bit to generate the requisite RDS. As soon as the counter's count exceeds a preset upper limit or falls below a preset lower limit, this triggers a bit-error indication. Such a technique is disclosed, for example, in Federal Republic of Germany published patent application DE-OS No. 20 30 763.

The digital circuitry needed for such exclusively digital error-detecting techniques can be of considerable cost. A further disadvantage of exclusively digital techniques relates to relatively high power consumption. For example, in the case of high digit transmission rates, e.g., 41 Mbits/sec., the error-recognition circuitry must in general be constituted by Schottky-TTL components and the power consumption of such an error-detection circuit can amount to almost 1 watt. Such a power-consumption level is very problematic where the repeater stations along the transmission path are not provided with local power supplies but instead with transmitted power from remote sources.

SUMMARY OF THE INVENTION

It is an object of the invention to provide an error-recognition circuit and method of the general type discussed above, but of such a nature as to inherently make possible lower-cost implementation and relatively low power consumption.

In accordance with one broad feature of the present invention, the RDS is monitored not by means of a forwards-backwards digital counter but instead employing an analog integrator. The analog signal developed by the analog integrator is then employed somewhat as the equivalent of a digital RDS.

According to a further feature of the invention analog-integrator circuitry employed is of such a configuration that the integrating action of the integrator is as nearly as possible ideal in the frequency range occupied by the frequency spectrum of the transmitted digital signal, but exhibits only low D.C. amplification.

According to a further concept of the invention, an error signal is produced when the thusly generated analog version of an RDS attempts to exceed a predetermined upper limit or fall below a predetermined lower limit. However, as this occurs, the analog RDS signal is not actually permitted to freely rise above the upper limit or freely fall below the lower limit, but instead is constrained to remain at the one of the two limits involved, and for so long as such attempt continues. This constitutes a particularly simple and advantageous way of getting the analog RDS signal back to values corresponding to error-free signal transmission, i.e., after the presence of an erroneous digit has been responded to, further erroneous digits are not being encountered, and the response of the error-detecting system to the erroneous digit is to be made part of the past history of the system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
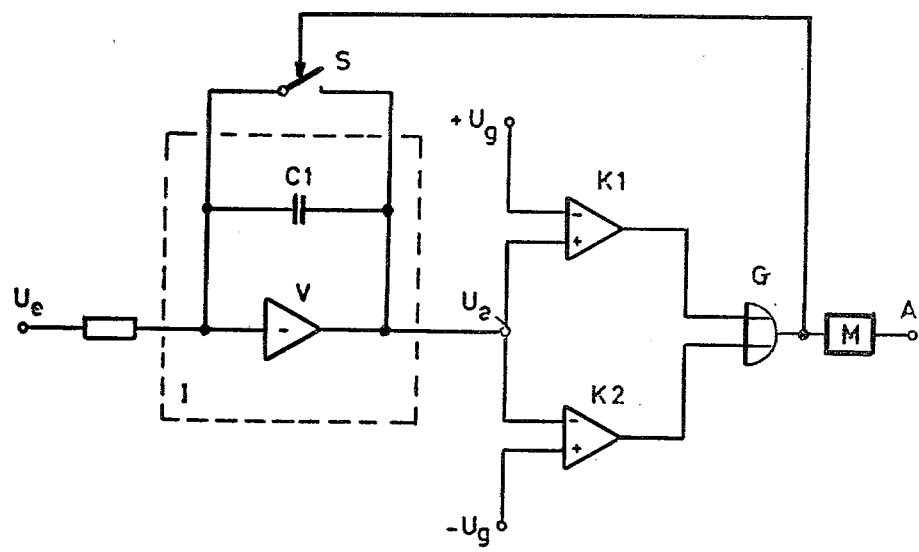
FIG. 1 is a schematic block diagram illustrating the general configuration of an error-detecting circuit such as contemplated by the invention.

In FIG. 1, an analog integrator is denoted in toto by reference character I and comprises an amplifier V, here an operational amplifier, and an integrator capacitor C1. The input of analog integrator I receives a binary coded data signal $U_e$. When the bit received at the input of integrator I is a "1", the signal $U_a$ at the output of the integrator becomes more positive by a predetermined increment, and when the received bit is a "0" becomes more negative by the same increment; attention is also directed to FIG. 2, discussed below. If the input signal $U_e$ is to be a ternary coded data signal, then receipt of a "+1" digit causes the output signal of the integrator to become more positive by a predetermined increment; receipt of a "−1" digit more negative by the same increment; and receipt of a "0" digit leaves the present value of the integrator's output signal $U_a$ unchanged.

The output signal $U_a$ of the integrator I is transmitted to two comparators K1, K2 and constitutes an analog version of an RDS signal. When output signal $U_a$ exceeds a reference voltage level $+U_g$, corresponding in analog form to the upper error-free limit value of the RDS, or falls below a reference voltage level $-U_g$, corresponding to the lower error-free limit value of the RDS, an output signal is produced by one or the other of the two comparators K1, K2, as the case may be. This indicates that the presence of a digit or symbol error has been detected. This error-responsive signal is transmitted via an OR-gate G to a circuit operative for ascertaining the digit-error rate. Simultaneously, a short-circuiting switch S (actually representative of a limiting circuit, discussed below) closes, to effect discharge of integrator capacitor C. In particular, switch S does not then open again until the discharge of an amount of energy such that, when integration is resumed, the output signal $U_a$ will not be above the reference voltage level $+U_g$ or below $-U_g$, as the case may be.

Figure 2:
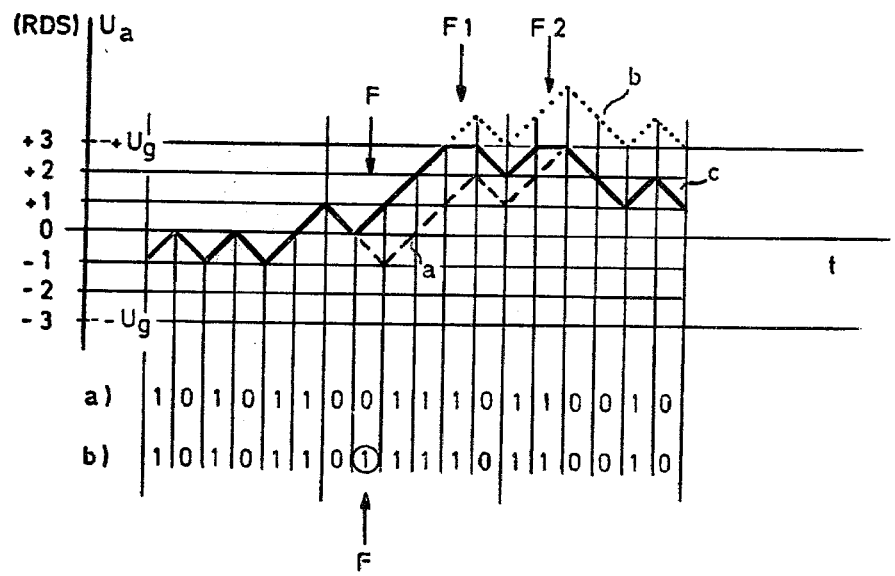
FIG. 2 is an explanatory diagram illustrating the principle of analog detection of digit error, with respect to a binary coded data signal.

FIG. 2 is an explanatory diagram, illustrating a situation in which a single erroneous bit in a transmitted bit stream results in the integrator output signal $U_a$ twice attempting to exceed the upper reference voltage level $+U_g$.

By way of example, three successive 6-bit words are represented in FIG. 2, line a of FIG. 2 indicating the three 6-bit words without error, and line b indicating the error encountered, in particular in the second bit of the second such 6-bit word. By way of example, the encoding scheme employed is such that, in the case of error-free transmission, the RDS of the transmitted binary coded data signal would be constrained to the range −3 to +3, inclusive. The upper reference voltage level $+U_g$ employed corresponds to the RDS value +3, and the lower reference voltage $-U_g$ to the RDS value −3.

Until the second bit of the second 6-bit word, there is in fact no error in the transmitted bits, and the analog RDS signal $U_a$ is, as indicated by the solid-line curve c in FIG. 2, confined within the range −3 to +3, inclusive. At the time of arrival of the erroneous bit, at F in FIG. 2, the analog RDS signal $U_a$ has an analog value corresponding to the RDS value 0, merely by way of example. As indicated by the broken-line curve a in FIG. 2, if this bit were not in fact erroneous, the signal $U_a$ would now decrease to a value corresponding to the RDS value −1. However, due to the bit error, signal $U_a$ instead increases to a value corresponding to the RDS value +1, as indicated by the solid-line curve c in FIG. 2. The solid-line curve c in FIG. 2 represents the actual value of the output signal $U_a$ of integrator I, during the ongoing course of the bit-error situation here depicted. Although the sole bit error involved has now been encountered, the value (+1) now assumed by the analog RDS signal $U_a$ is not at all near either of the two reference voltage levels $+U_g$, $-U_g$, as it so happens here by way of example. However, the RDS signal is now two units higher than would be the case if not bit error at all were involved, and eventually the value of the RDS signal will attempt to exceed $+U_g$, corresponding to the upper RDS limit +3; in this explanatory instance, this occurs upon receipt of the fifth bit of the second 6-bit word represented in FIG. 2, i.e., occurs at the point F1 where, absent such error, the RDS signal (see now broken-line curve a) would have assumed a value corresponding to RDS value +2. The dotted-line curve b indicates the changes in value which would be exhibited by the analog RDS signal $U_a$, if, as is here not done, the signal $U_a$ were permitted to rise to values corresponding to RDS values greater than +3.

As indicated by solid-line curve c, upon receipt of the fifth bit of the second 6-bit word, the RDS signal $U_a$ is constrained to a value corresponding to RDS value +3, i.e., is not permitted to freely increase to a value corresponding to an RDS value of +4.

In response to the next bit, here the sixth bit of the second 6-bit word, the RDS signal $U_a$ decreases from a value corresponding to +3 to a value corresponding to +2. However, it will be noted that the solid-line curve c has still not come back into coincidence with the broken-line curve a; i.e., the effect of the earlier and solitary bit error is still being felt by the error-detecting system.

Eventually, solid-line curve c does come back into coincidence with the broken-line curve a, namely at F2 in this explanatory situation, and the effect of the earlier bit error is now past in the history of operation of the error-detecting system.

How many bits are received between receipt of the actually erroneous bit at time F, on the one hand, and, on the other hand, the first attempt by analog RDS signal Ua, at F1, to exceed a value corresponding to RDS value +3, depends upon the particular combination of bits which happen to be received. Likewise, the number of bits received between the first such attempt at F1 and the second such attempt at F2 depends upon the particular combination of bits which happen to be present. In the explanatory situation illustrated, two such attempts, at F1 and F2, are made before, at F2, the analog RDS signal returns to the value which it would have had in the case that no bit error at all would have occurred, but the number of such attempts, and likewise the number of bits received before the error-detecting circuitry ceases to experience the effect of the erroneous bit, is dependent upon the particular combination of bits which happen to be received. More generally, such numbers of bits and attempts depend upon the statistics of the bit content of the binary data signal involved. Mainly, it is only of importance that the two attempts of signal $U_a$, at F1 and F2, to exceed upper reference voltage level +$U_g$ not be permitted, to the extent possible, to trigger two bit-error indications, inasmuch as only one bit error is actually involved.

Accordingly, limiting the analog RDS signal to a value corresponding to RDS value +3 (and at the other end of such range −3) constitutes a particularly simple and advantageous way of constraining the value of signal Ua to eventually return to the value which it would have had absent the encountering of the erroneous bit.

Figure 3:
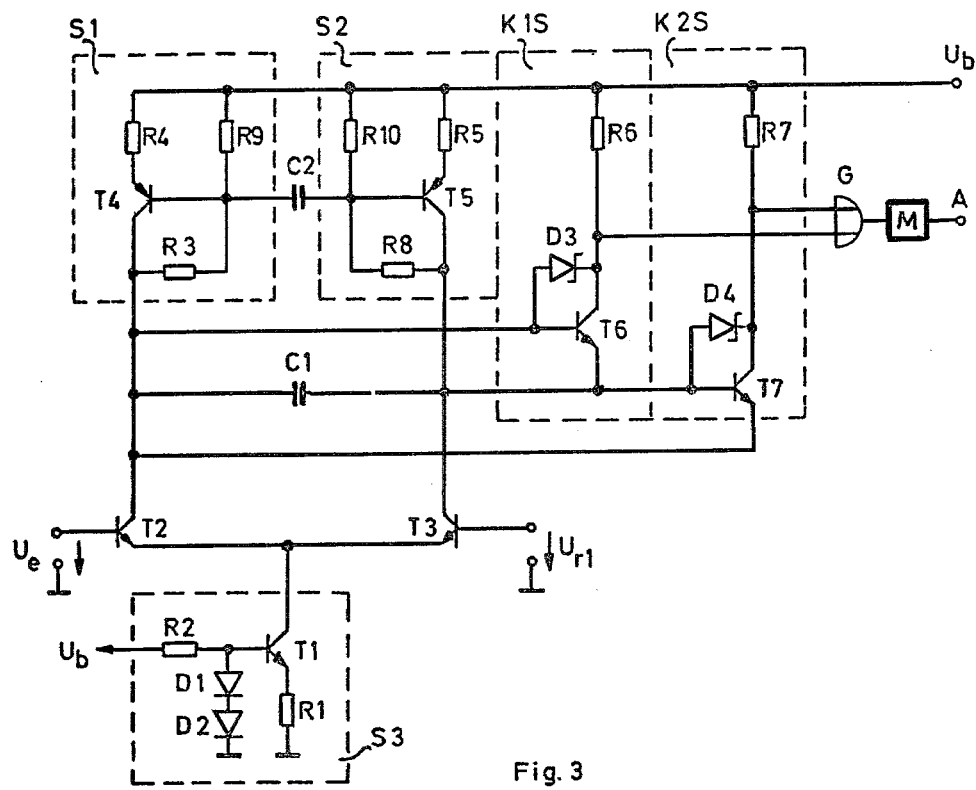
FIG. 3 is a detailed circuit diagram of an error-detecting circuit designed to monitor error in a binary coded data signal.

FIG. 3 depicts a detailed circuit diagram of an exemplary error-detecting circuit embodying the present invention, and by way of example designed to detect the digit errors within a binary coded data signal.

The operational amplifier V of FIG. 1 is in FIG. 3 constituted by a differential amplifier comprised of transistors T2, T3; collector impedance stages S1, S2 connected in the collector circuits of respective ones of the transistors T2, T3; an emitter-current source S3 connected in the common emitter circuit of the two transistors T2, T3; and a capacitor C2 connecting together the two collector impedance stages S1, S2. The provision of capacitor C2 has the result that the two collector impedances S1, S2 act as constant-current sources, within the frequency range occupied by the frequency spectrum of the digital signal to be monitored, but act as constant-voltage sources at zero frequency, i.e., from the D.C. viewpoint. The binary coded digital signal $U_e$ whose RDS is to be monitored is applied to the base of transistor T2. A reference voltage $U_{r1}$ is applied to the base of transistor T3 and has a voltage level midway between the voltage level of a binary "1" and that of a binary "0" of the data signal $U_e$. The integrator capacitor C1 is connected between the two collectors of T2 and T3.

The function of the two comparators K1, K2 and of switch S of FIG. 1 is performed in FIG. 3 by two circuit stages K1S and K2S. The collectors of the two transistors T6, T7 of K1S and K2S are connected via respective resistors R6, R7 to the source of operating voltage $U_b$. The collector of T2 is connected to the collector of T3 via the base-emitter junction of T6, and the collector of T3 is connected to the collector of T2 via the base-emitter junction of T7; i.e., the base-emitter junctions of T6 and T7 are connected antiparallel to each other, and their antiparallel combination connected in parallel to integrator capacitor C1. Absent bit error, the voltage across integrator capacitor C1 changes value within a range of values such as not to reach the threshold voltage of the base-emitter junction of either one of the two transistors T6, T7. When a bit error is encountered, the voltage across capacitor C1 eventually renders one or the other of the two transistors T6, T7 conductive, as the case may be, and an error signal is transmitted from the collector of the affected one of the two transistors T6, T7 to the output of OR-gate G.

If the transistors T6, T7 are to respond in this way but with high precision and extreme quickness problems may arise, if countermeasures are not taken, from the fact that the base-emitter junctions of T6 and T7 do not exhibit sharp switch-on action and likewise, if these transistors are designed to saturate, a sluggish response may result due to storage-time effects. Furthermore, absent the countermeasures about to be described, the integrator capacitor C1 would not actually be directly short-circuited, with the result that collector current flowing through the imperfectly short-circuited capacitor C1 might not preclude the development of a D.C. voltage component across the capacitor.

In the circuit of FIG. 3, countermeasures are taken to avoid these difficulties. Schottky diodes D3, D4 are connected between the bases and collectors of respective ones of the two comparator transistors T6, T7. The transistors T6, T7 are here upn transistors, and the Schottky diodes are connected with their anodes to the bases and their cathodes to the collectors of the two transistors. Additionally, collector resistors R6, R7 of high resistance value (e.g., ca. 20 kohm) are employed. Accordingly, as soon as one of the comparator and limiter transistors T6, T7 begins to be rendered conductive, the base current excess of the affected transistor is diverted away by the respective Schottky diode, so that the now almost constant base current of the transistor involved result in a constant base-emitter voltage. Accordingly, the integrator capacitor C1 is directly discharged via the affected Schottky diode and the collector-emitter path of the associated transistor. The associated transistor does not saturate and the small collector current which develops is not of such a magnitude as to establish any but a negligible D.C. voltage component across the integrator capacitor C1.

The collector impedances S1, S2 of the two differential-amplifier transistors T2, T3 are constituted by respective transistors T4 and T5 provided with respective emitter resistors R4, R5 connected to the operating voltage $U_b$, respective collector-base resistors R3, R8 and respective base-bypass resistors R9, R10.

The capacitor C2 is connected between the bases of the two transistors T4, T5. The provision of capacitor C2 establishes a high amplification for the frequency range which contains the frequency spectrum of the binary coded data signal to be monitored, but establishes an extremely low D.C. amplification, i.e., for zero frequency. To this end, the emitter resistors R4, R5 advantageously have low resistance values (e.g., ca. 150 ohms), and the collector-base resistors R3, R8 connected together by capacitor C2 advantageously have high resistance values (e.g., ca. 20 kohms).

Provision of capacitor C2 serves to effect D.C. decoupling as between the two transistors T4 and T5, so that these operate as constant-voltage sources having respective internal resistances R4 and R5, from the D.C. standpoint, i.e., at zero frequency. Because of the extremely low D.C. gain established, lack or symmetry in the components of the two branches of the differential amplifier has a minimal effect upon the integrating action of the analog integrator. In contrast, in the frequency range occupied by the frequency spectrum of the binary coded data signal to be monitored, the bases of the two transistors T4, T5 are connected to a common potential and then constitute constant-current sources of high output resistance.

The constant-current source S3 connected in the common emitter circuit of the two differential-amplifier transistors T2, T3 comprises a transistor T1, resistors R1, R2, and diodes D1, D2. The collector-emitter path of transistor T1 is connected to ground via its emitter resistor R1 and via the two differential-amplifier transistors T2, T3. The base of T1 is connected via the resistor T2 to the operating voltage $U_b$. The first diode D1 of the two diodes D1, D2 connecting the base of T1 to ground establishes a biasing voltage for transistor T1 and compensates for the temperature-dependence of the base-emitter junction of the constant-current-source transistor T1.

In order to compensate for the temperature-dependence of the threshold voltage of the base-emitter junctions of the two limiter transistors T6, T7, i.e., so that neither of these transistors T6, T7 improperly become conductive at elevated ambient temperatures, use is made of the second diode D2, connected between first diode D1 and ground. This imparts to constant-current source S3 a temperature-dependence which modifies the output voltage of the analog integrator in such a manner as to take into account the temperature-dependence of the base-emitter junctions of the limiter transistors T6 and T7.

The error signals produced at the collectors of the limiter transistors T6, T7 are applied to the OR-gate G because, for a determination of the bit-error rate, it makes no difference whether the RDS has exceeded its upper permissible limit value or its lower permissible limit value, i.e., resulting from a negative bit error (an erroneous "0" instead of a "1") or a positive bit error (an erroneous "1" instead of a "0").

The error signal produced at the output of OR-gate G lasts at least until the receipt of the next bit, and this error signal triggers a monostable circuit M whose unstable state has a duration $t_1$. The monostable circuit M should be of the type which, after being thusly triggered, cannot again be triggered by another such error signal until the elapse of a time interval of duration $t_1 + t_2$. Accordingly, the error pulse produced at the output A of monostable circuit M is suitable for direct application to an evaluating circuit, for example constituted by CMOS components; i.e., the error pulse produced at output A of monostable circuit M is already in a form suitable for evaluation by a relatively slow-acting logic circuit of low power consumption.

The duration $t_1$ of the unstable state of the monostable circuit M should, for the case of a binary coded digital signal, be selected long enough that, in the case for example of the situation depicted in FIG. 2, when the error at F causes the analog RDS signal $U_a$ to twice attempt to pass beyond one of the reference voltage levels $+U_g$, $-U_g$, at F2, only a single error indication will actually be counted by whatever counter the (non-illustrated) evaluating circuit employs for generation of error-rate information. Accordingly, the duration of time interval $t_l$ is to be adjusted to a value which depends upon the statistical distribution of the "0" and "1" bits in the particular information transmitted and depends, more generally, upon the statistics of the encoding scheme employed.

Figure 4:
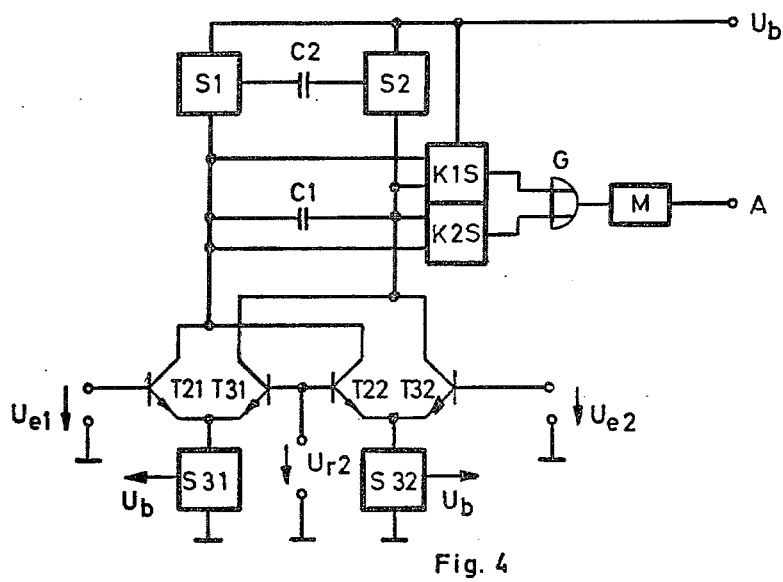
FIG. 4 depicts a modified version of the circuit shown in FIG. 3, designed to monitor error in a ternary coded data signal.

FIG. 4 depicts a modification of the embodiment of FIG. 3, here designed to monitor errors in a ternary coded digital signal. The main difference relative to the circuit configuration of FIG. 3 resides in the use of a cross-coupled differential-amplifier configuration comprised of two pairs of differential-amplifier transistors T21, T31 and T22, T32. A first constant-current source S31 is connected in the common emitter circuit of transistors T21, T32, and a second such constant-current source S32 in that of the transistors T22, T32. Each of the two constant-current sources S31, S32 can be of an internal configuration identical to that of S3 in FIG. 3. The collectors of transistors T21 and T22 are connected in common, and the collectors of transistors T31 and T32 are connected in common. These two common-collector junctions are, in turn, connected together by integrator capacitor C1. The ternary coded digital signal $U_{e1}$ to be monitored is applied to the base of transistor T21. An inverted version $U_{e2}$ of the ternary signal of interest is applied to the base of transistor T32; in ternary code, the digits $+1, 0, -1$ are respectively inverse to the digits $-1, 0, +1$. The bases of the two transistors T31, T22 are connected in common and receive a reference voltage $U_{r2}$ whose voltage level is midway between the voltage level of a ternary "0" and a ternary "+1". The remaining circuit stages, i.e., the collector impedance stages S1, S2, the capacitor C2, the two comparator and limiter stages KIS, K2S, the OR-gate G, and the monostable circuit M, have internal configurations and are interconnected in the same manner as in FIG. 3. If the ternary coded digital signal being monitored was derived from a binary coded digital signal in accordance with the alternate mark inversion (AMI) technique, then the monostable circuit M need merely serve to convert each generated error pulse into a pulse of a length suitable for application to the error-rate evaluating circuitry to be employed; this is because, with the AMI technique, the analog RDS signal produced by the integrator will attempt to pass beyond one of the two limit values only once in response to one ternary-digit error.

The operation of the ternary-code embodiment of FIG. 4 is in other respects analogous to the binary-code embodiment of FIG. 3; however, in response to a ternary 37 0" digit, the analog RDS signal produced at the output of the integrator undergoes no change in value.

It will be understood that each of the elements described above, or two or more together, may also find a useful application in other types of circuits and contexts differing from the types described above.

While the invention has been illustrated and described as embodied in particular circuits operative for detecting digit error for binary and ternary coded digital dignals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An error detection system for detecting transmission errors in a digital signal composed of a stream of digits, when the digital signal is encoded in a manner that a running sum of the digits will, when the digital signal is properly transmitted, lie between a predetermined upper bound and a predetermined lower bound, comprising:
   an analog integrator responsive only to the digital signal and producing an analog sum signal with an analog value corresponding to the running sum of the digits in the digital signal; and
   a comparator stage responsive only to the sum signal and testing it to determine whether the sum signal lies between the predetermined upper bound and the predetermined lower bound, the comparator operating in a manner that in the event the sum signal fails to lie between the predetermined upper bound and the predetermined lower bound, an error signal will be generated.

2. The system defined by claim 1, further including a limiter connected to the analog integrator and responsive to the error signal, the limiter operating in a manner that when an error signal is generated, the sum signal from the analog integrator is prevented from rising above the predetermined upper bound and is further prevented from falling below the predetermined lower bound.

3. The system defined by claim 2, wherein the analog integrator is unresponsive to DC components in the digital signal and is highly responsive to AC components therein.

4. The system defined by claim 1, wherein the digits are in a binary form with a low level and a high level.

5. The system defined by claim 4, wherein the analog integrator includes:
   a first transistor having a base, an emitter, and a collector;
   a second transistor having a base, an emitter and a collector and being connected to the first transistor to form a common-emitter differential amplifier;
   a first collector impedance stage connected to the collector of the first transistor;
   a second collector impedance stage connected to the collector of the second transistor;
   an integrating capacitor connected between the collectors of the first and second transistors;
   a second capacitor connected between the first and second collector impedance stages;
   a current source connected to the emitters of the first and second transistors;
   a front end connected to the base of the first transistor and delivering the digital signal thereto; and
   a reference end connected to the base of the second transistor and delivering an intermediate level signal thereto, the intermediate level signal being midway between said high level and said low level.

6. The system defined by claim 1, wherein the digits are in a binary form with a low level, an intermediate level and a high level.

7. The system defined by claim 6, wherein the analog integrator includes:
   first and second transistors each having an emitter, a collector, and a base, the emitters of the first and second transistors being connected together to form a first pair;
   third and fourth transistors each having an emitter, a collector, and a base, the emitters of the second and third transistors being connected together to form a second pair, the collectors of the first and third transistors being connected together and the collectors of the second and fourth transistors being connected together in order to form a cross-coupled differential amplifier;
   an integrating capacitor connected between the collectors of the first and third transistors and the second and fourth transistors;
   a first collector impedance stage connected to the collectors of the first and third transistors;
   a second collector impedance stage connected to the collectors of the second and fourth transistors;
   a second capacitor connected between the first and second collector impedance stages;
   a first current source connected to the emitters of the first and second transistors;
   a second current source connected to the emitters of the third and fourth transistors;
   a front end connected to the base of the first transistor and delivering the digital signal thereto;
   an inverting end connected to the base of the fourth transistor and delivering an inverted signal thereto, the inverted signal being a logical inversion of the digital signal; and
   a reference end connected to the bases of the second and third transistors and delivering a reference signal thereto, the reference signal being midway between said intermediate level and a predetermined one of the low and high levels.

8. The systems defined by claims 5 or 7, wherein each collector impedance stage includes:
   a collector transistor having an emitter, a base and a collector;
   a first resistor connected between the collector and the base of the collector transistor;
   a second resistor connected between the emitter of the collector transistor and a terminal of a power source;
   a third resistor connected between the base of the collector transistor and said terminal;

and wherein the bases of the collector transistors of the first and second collector impedance stages are connected together by a third capacitor.

9. The system defined by claim 8, wherein the first resistor has a high value and the second resistor has a low value.

10. The systems defined by claims 5 or 7, wherein each current source includes:
- a source transistor having an emitter, a collector and a base;
- an emitter resistor connected between the emitter of the source transistor and a terminal of a power supply; and
- a circuit connected between the base of the source transistor and said terminal, the circuit including a compensating diode with temperature-dependent characteristics such that variation of base-emitter current through the source transistor caused by temperature variations is compensated by the compensating diode.

11. The systems defined by claims 5 or 7, wherein the comparator stage includes:
- a comparator transistor having a collector and an emitter-base junction, the emitter-base junction of the comparator transistor being connected in parallel with the integrating capacitor;
- a limiter transistor having a collector and an emitter-base junction, the emitter-base junction of the limiter transistor being connected in parallel with the integrating capacitor and being connected antiparallel to the emitter-base junction of the comparator transistor;
- an OR-gate having a first input, a second input, and an output, the first input being connected to the collector of the comparator transistor and the second input being connected to the collector of the limiter transistor; and
- a monostable circuit connected to the output of the OR-gate, whereby when an error signal appears at either of the collectors of the comparator transistor and the limiter transistor, the monostable circuit will be triggered into an unstable state through the OR-gate.

12. The system defined by claim 5 or 7, wherein the analog integrator includes an amplifier and an integrating capacitor connected thereto to form an integrating amplifier, wherein the comparator stage includes a comparator transistor having a base, an emitter-base junction and a collector, the emitter-base junction of the comparator transistor being connected in parallel with the integrating capacitor and the collector of the comparator transistor being connected to a first collector resistor, and wherein the limiter includes a limiter transistor having a base, an emitter-base junction and a collector, the emitter-base junction of the limiter transistor being connected in parallel with the integrating capacitor and being connected antiparallel to the emitter-base junction of the comparator transistor and the collector of the limiter transistor being connected to a second collector resistor.

13. The system defined by claim 12, further including a first Schottky diode connected between the base and the collector of the comparator transistor and a second Schottky diode connected between the base and the collector of the limiter transistor, the first and second collector transistors having a high resistance value.

* * * * *